United States Patent Office 3,436,430
Patented Apr. 1, 1969

3,436,430
NONCATALYTIC PROCESS FOR MANUFACTURE OF CHLOROFLUOROALIPHATIC HYDROCARBONS
Larry Eugene Hall, Lizton, Ind., assignor to E. I. du Pont de Nemours and Company, Wilmington, Del., a corporation of Delaware
No Drawing. Filed Jan. 11, 1967, Ser. No. 608,503
Int. Cl. C07c 21/18
U.S. Cl. 260—653.4                10 Claims

ABSTRACT OF THE DISCLOSURE

A process for the manufacture of chlorofluoroaliphatic hydrocarbons by the noncatalytic reaction of aliphatic hydrocarbons or partially chlorinated aliphatic hydrocarbons with hydrogen fluoride and chlorine.

BACKGROUND OF THE INVENTION

It is well known that chlorofluoroaliphatic hydrocarbons may be prepared by the reaction of an aliphatic hydrocarbon with chlorine and hydrogen fluoride in the presence of a fluorination catalyst. In French Patent 1,338,591, such a catalytic process is described in which contact times of only a few seconds are required. Although such catalytic processes are commercially useful, the use of a catalyst always brings forth certain problems. For example, catalysts tend to become deactivated and periodically must be either reactivated or replaced. Either course requires shutdown of the operation with resulting loss of productivity.

Noncatalytic fluorinations have been investigated to only a limited extent since very little encouragement has been generated by these limited investigations. In general, it has been found that unduly long reaction times or extremely high pressures are required to achieve satisfactory conversions in the absence of a catalyst. The noncatalytic reaction of methyl chloroform and hydrogen fluoride in an autoclave at 150° C. under autogeneous pressure is described by Scherer in U.S. Patent 2,146,354. For complete reaction, heating for 1–2 hours was required. In the Journal of the Society of the Chemical Industry, vol. 67, pages 331–333 (Aug., 1948), Brown et al. describe the noncatalytic reaction of a chlorinated hydrocarbon such as carbon tetrachloride, tetrachloroethane, pentachloroethane, hexachloropropylene or methylchloroform with hydrogen fluoride. These reactions were carried out in an autoclave at temperatures in the range of 144–230° C. and pressures in the range of about 500–1000 p.s.i. Reaction times varied from 15 minutes to 2.5 hours. In Industrial and Engineering Chemistry, vol. 39, No. 3, pages 404–409 (March, 1947), McBee et al. teach the noncatalytic reaction of carbon tetrachloride and hydrogen fluoride at about 400° C. in a tube reactor. They found that the reaction was pressure dependent. At atmospheric pressure only about 10% conversion to fluorinated products was obtained; at 70 atmospheres about 50% conversion was obtained, and at 200 atmospheres about 95% conversion was obtained. In U.S. Patent 2,443,630 McBee et al. claim such a process in which pressures of at least 50 atmospheres are required.

DESCRIPTION OF THE INVENTION

It has now been discovered that aliphatic hydrocarbons and partially chlorinated aliphatic hydrocarbons can be converted to chlorofluoroaliphatic hydrocarbons at low pressure and short reaction times by the noncatalytic process which comprises reacting an aliphatic starting material selected from the group consisting of aliphatic hydrocarbons of 1–4 carbon atoms and partially chlorinated aliphatic hydrocarbons of 1–4 carbon atoms with at least about one mole of hydrogen fluoride and at least about one mole of chlorine per mole of aliphatic starting material in the absence of fluorination catalyst in the vapor phase at a temperature of about 300–500° C., a pressure of about 1–10 atmospheres and a reaction time of 1–60 seconds. When operating in accordance with this invention, conversions of the order of about 90–100% can be obtained at reaction times of only a few seconds. Moreover, these reactions are not pressure dependent, that is, these excellent results can be obtained at atmospheric pressure.

The aliphatic starting materials used in accordance with this invention are aliphatic hydrocarbons of 1–4 carbon atoms and partially chlorinated aliphatic hydrocarbons of 1–4 carbon atoms. The term "aliphatic hydrocarbons of 1–4 carbon atoms," as used herein, includes paraffins such as methane, ethane, propane, and butane, olefins such as ethylene, propylene, butylene and isobutylene, and also acetylene and butadiene. The preferred aliphatic hydrocarbons are methane and ethylene.

The term "partially chlorinated aliphatic hydrocarbons of 1–4 carbon atoms," as used herein, includes chlorinated methanes, ethanes, ethylenes, acetylene, propanes, propylenes, butanes, butenes and butadienes which contain at least one hydrogen atom. Preferably the partially chlorinated aliphatic hydrocarbon contains more atoms of hydrogen that chlorine. Suitable partially chlorinated aliphatic hydrocarbons include methyl chloride, methylene chloride, chloroform, ethyl chloride, ethylidene chloride, ethylene dichloride, trichloroethane, vinyl chloride, vinylidene chloride, trichloroethylene and the mono-, di- and tri-chloro-propanes, -propylenes, -butanes, -butylenes and -butadienes. The preferred partially chlorinated aliphatic hydrocarbons are methyl chloride and ethyl chloride.

The relative proportion of aliphatic starting material, hydrogen fluoride and chlorine used in the process of this invention may be varied over wide limits. The ratio of hydrogen fluoride to aliphatic starting material has some effect upon the nature of the product. Since it is generally desired that the product contain at least one fluorine atom, at least one mole of hydrogen fluoride should be charged per mole of aliphatic starting material. If products containing two fluorines per molecule are desired, at least two moles of hydrogen fluoride should be used. In general, it is not possible to obtain any substantial amount of methane derivatives containing more than two fluorines or ethane derivatives containing more than three fluorines. Accordingly, large excesses of hydrogen fluoride may be used without markedly altering the results when methanes and ethanes containing two and three fluorines, respectively, are desired. In these cases excess hydrogen fluoride may be used to advantage to help control the reaction temperature.

At least about one mole of chlorine should be charged per mole of aliphatic starting material for satisfactory results. The exact mole ratio of chlorine to aliphatic starting material will depend on the desired product. In general, about one mole of chlorine should be charged per equivalent of hydrogen to be replaced and unsaturation to be saturated in the aliphatic starting material. For the purpose of this invention, the number of equivalents of hydrogen present is determined by multiplying the moles of aliphatic starting material charged by the number of hydrogens per molecule. The number of equivalents of unsaturation present is determined by multiplying the moles of aliphatic starting material charged by the number of unsaturated bonds per molecule, counting one for each double bond and two for each triple bond. When it is desired to replace all hydrogens and to saturate all unsaturation in the aliphatic starting material, excess chlorine may be used. If less than complete replacement of hydrogen is desired, excess chlorine should be avoided and usually a slight deficiency from the amount specified above is preferred. In this case, the incompletely converted materials containing less than the desired amount of halogen are recycled.

It is generally well known that the reaction between an aliphatic hydrocarbon or a partially chlorinated aliphatic hydrocarbon and chlorine is highly exothermic. Unless care is taken, the exothermic heat of these reactions can cause excessive temperatures with resulting pyrolysis, carbonization and the like. A number of means for controlling this temperature have been suggested in the art.

The most efficient means for controlling the temperature of this process seems to be the addition of an inert diluent to the reaction stream. The term "inert," as used in reference to the diluent, means inert to reaction with chlorine, but not necessarily inert to reaction with hydrogen fluoride. The inert diluent may be a truly inert gas such as nitrogen or hydrogen chloride, or it may be an aliphatic compound which is nonreactive with chlorine but capable of being fluorinated by hydrogen fluoride, for example carbon tetrachloride, monofluorotrichloromethane or a corresponding perhaloethane such as monofluoropentachloroethane. Perhalomethanes are conveniently used as diluent when chlorofluoromethane products are being prepared, and perhaloethanes or perhaloethylenes when chlorofluoroethane products are being manufactured. Similarly perhalo-propanes and -butanes may be used when chlorofluoro-propanes and -butanes, respecteively, are being prepared. This selection of inert diluent simplifies the procedure for recovering the chlorofluorocarbon product.

Sufficient diluent should be used to control the reaction temperature. The amount required will depend on the amount of chlorination taking place and the particular diluent used. Complete chlorination of methane obviously produces more heat than complete chlorination of methyl chloride. The ability of the diluent to absorb heat and hence control temperature depends, in part at least, on its molecular weight. Thus, lower molecular weight diluents such as nitrogen and hydrogen chloride are less efficient than higher molecular weight diluents such as carbon tetrachloride. The amount of diluent required will also depend upon the presence or absence of other means for controlling temperature. Although the use of a diluent is the preferred method for controlling temperature, other known means could be substituted for all or part of the diluent.

When diluent is used as the sole means for controlling temperature, at least about one mole of diluent should be charged per mole of aliphatic starting material. In most cases, it has been found that at least about four moles of diluent should be present per mole of aliphatic starting material for good results. For example, when methane is being completely chlorinated, 4–25 moles of carbon tetrachloride are preferred. The diluent is separated from the reaction product at the end of the reaction and either discaded or recycled, depending on the nature of the diluent.

The process of this invention can be carried out at temperatures of about 300–500° C. At temperatures below about 300° C. low conversions to fluorine-containing products may be encountered. Many of the chlorofluoroaliphatic hydrocarbon products become unstable at temperature above about 500° C. Accordingly, the reaction temperature should not markedly exceed this temperature. Preferably reaction temperatures of about 350–450° C. are used.

These reactions proceed well at atmospheric pressure. In general, no substantial improvement in conversion is encountered by the use of elevated pressures. There are occasions, however, usually for engineering reasons, when it is desirable to carry out the reaction at pressures in excess of atmospheric. For example, it may be desirable to recover the product by distillation at elevated pressure. In these cases, it is advantageous to run the fluorination reaction at a pressure intermediate between atmospheric and the pressure used in the distillation. Even in these cases, however, reaction pressures seldom exceed about 10 atmospheres. Preferably the reaction is carried out at pressures below about 5 atmospheres. The reaction takes place in the vapor phase.

Reaction times of at least about one second should be used. Longer times may be used, but little is gained by using reaction times longer than about one minute. Reaction times of about 1–30 seconds are preferred.

Preferably the reaction is carried out in a continuous manner using an empty tubular reactor. Hydrogen fluoride, chlorine, aliphatic starting material and diluent, if used, are continuously fed to one end of the reactor while the reaction product is continuously removed from the other. The temperature and reaction time are adjusted to produce the desired product composition. Good mixing of reactants is of course desirable. Although the order of addition is not critical, for temperature control purposes it is generally preferable to mix the aliphatic starting material with the hydrogen fluoride and any diluent before adding the chlorine. In starting up the reaction, it is necessary to supply heat to the reactor until the exothermic chlorination reaction takes over. Any suitable means of heating the reactor may be employed.

The reactor and associated equipment used for the process of this invention should be resistant to chlorine, hydrogen fluoride and hydrogen chloride under the reaction conditions. In general, metals such as most steels, stainless steels, nickel and high nickel alloys such as Inconel and Hastelloy are satisfactory.

The product effluent may be worked up in any of the ways known to those skilled in the art. One method is to scrub the gaseous effluent from the reaction with dilute aqueous potassium or sodium hydroxide to remove chlorine, hydrogen chloride and hydrogen fluoride, dry the gas and condense the liquid product by cooling.

In commercial practice, reactants, by-products and desired products are separated by subjecting the product mixture to appropriate distillations, normally at elevated pressures. For example, in the reaction of methane, hydrogen fluoride and chlorine in the presence of carbon tetrachloride as diluent, the reactor effluent is first compressed to a pressure of about 450 p.s.i.g. and then subjected to distillation. Hydrogen chloride is first removed overhead and the remaining materials are removed to a second still where the more volatile materials, including the product, are distilled off. The carbon tetrachloride which remains as the bottoms is recycled to the reaction. The overhead distillate from the second still passes into a third still where excess chlorine is distilled from the product mixture and recycled to the reactor. The remaining product mixture is chilled so that hydrogen fluoride separates as a distinct phase and the phases are separated. The product mixture is then scrubbed to remove traces of acids, dried and fractionated into the individual compounds which are predominantly monofluorotrichloromethane and dichlorodifluoromethane. Other reaction products can be separated and purified in a similar manner, the exact scheme depending on the nature of the products themselves, as will be apparent to those skilled in the art.

The following examples, illustrating the novel process of the present invention, are given without any intention that the invention be limited thereto. In these examples, the terms "percent conversion" and "percent yield" are defined as follows:

Percent conversion of A=Moles of A converted ×100/ moles of A charged.

Percent yield of B=Moles of B formed ×100/moles of aliphatic starting material converted.

The stated reactant feed rates were measured at 25° C. and atmospheric pressure. In every case, the reactor was cleaned prior to use to remove possible trace amounts of catalysts such as metal salts and carbon.

EXAMPLE 1

A mixture of methane, hydrogen fluoride, chlorine and hydrogen chloride was passed through an empty 450 ml. "Inconel" U-tube reactor, heated in a salt bath. The reaction took place under the following conditions:

Temperature _____° C__ 420
Pressure _____ Atmospheric
Residence time _____sec__ 13
Feed rates:
   $CH_4$ _____ml./min__ 101
   HF _____g./hr__ 10
   $Cl_2$ _____ml./min__ 404
   HCl _____g./hr__ 73.2
Relative moles, $CH_4/HF/Cl_2/HCl$ _____ 1/2/4/2

The product was scrubbed with dilute aqueous KOH, dried and collected in an ice cooled trap. Liquid which condensed in the trap and uncondensed gaseous materials were both measured and analyzed. After 70 minutes, 5.93 liters of gaseous product and 14.6 g. of liquid product were collected and found to have the following compositions:

| Component: | Gas, vol. percent | Liquid, vol. percent |
|---|---|---|
| $CFCl_3$ | 67.4 | 16.8 |
| $CF_2Cl_2$ | 9.3 | Trace |
| $CCl_4$ | 23.4 | 83.2 |

No hydrogen containing products were detected. The analyses indicated the following results:

Percent conversion, methane _____ 100
Percent yield:
   $CFCl_3$ _____ 53.8
   $CF_2Cl_2$ _____ 6.7
   $CCl_4$ _____ 39.5

EXAMPLE 2

Using the apparatus described in Example 1, ethylene, hydrogen fluoride and chlorine were reacted under the following conditions:

Temperature _____° C__ 410
Pressure _____ Atmospheric
Residence time _____sec__ 9
Feed rates:
   $C_2H_4$ _____ml./min__ 101
   HF _____g./hr__ 36
   $Cl_2$ _____ml./min__ 606
Relative moles, $C_2H_4/HF/Cl_2$ _____ 1/7.2/6

After one hour of continuous reaction, 40.0 grams of liquid product were collected. Analysis of the product indicated the following results:

Percent conversion, $C_2H_4$ _____ 100
Percent yield:
   $CF_3CF_2Cl$ _____ 0.16
   $CFCl_3$ _____ 0.04
   $CF_2ClCFCl_2$ _____ 1.81
   $CFCl_2CFCl_2$ _____ 24.20
   $CHCl_2CH_3$ _____ 0.08
   $CH_2ClCH_2Cl$ _____ 0.51
   $CCl_4$ _____ 0.17
   $CCl_2=CCl_2$ _____ 45.30
   $CHCl_2CHCl_2$ _____ 22.9
   $C_2HCl_5$ _____ 0.47
   $C_2Cl_6$ _____ 3.62

EXAMPLE 3

Using the apparatus of Example 1, methyl chloride, hydrogen fluoride and chlorine were reacted under the following conditions:

Temperature _____° C__ 350
Pressure _____ Atmospheric
Residence time _____sec__ 12
Feed rates:
   $CH_3Cl$ _____ml./min__ 101
   HF _____g./hr__ 36
   $Cl_2$ _____ml./min__ 300
Relative moles, $CH_3Cl/HF/Cl_2$ _____ 1/7.2/3

After 90 minutes of continuous reaction, 6.58 liters of gaseous product were obtained. Analysis of this product indicated the following results:

Percent conversion, $CH_3Cl$ _____ 100
Percent yield:
   $CF_3Cl$ _____ 6.9
   $CHF_3$ _____ 12.4
   $CHF_2Cl$ _____ 29.9
   $CF_2Cl_2$ _____ 5.2
   $CHFCl_2$ _____ 24.4
   $CFCl_3$ _____ 11.2
   $CH_2Cl_2$ _____ 5.6
   $CHCl_3$ _____ 3.6
   $CCl_4$ _____ 0.6

EXAMPLES 4–7

Using apparatus similar to that used in Example 1, except that the reactor was a ⅜ in. outside diameter (9.53 mm.) type 316 stainless steel pipe capable of being operated under pressure, methane, hydrogen fluoride, chlorine and recycle carbon tetrachloride were reacted as follows:

| Reaction Conditions | Example | | | |
|---|---|---|---|---|
| | 4 | 5 | 6 | 7 |
| Temperature, °C | 360 | 425 | 440 | 460 |
| Pressure, p.s.i.g | 45 | 45 | 45 | 45 |
| Residence time, sec | 2 | 2 | 2 | 2 |
| Relative moles: | | | | |
| $CH_4$ | 1 | 1 | 1 | 1 |
| HF | 1.7 | 1.7 | 1.7 | 1.7 |
| $Cl_2$ | 4 | 4 | 4 | 4 |
| $CCl_4$ | 6 | 6 | 6 | 6 |

Acidic components and chlorine were removed from the product by scrubbing with aqueous alkali. After drying, the acid-free product was totally condensed and distilled. The nonfluorinated by-products were recycled. The fluorinated products were collected. The following conversions and yields were determined by analysis of the product stream.

| Result | Example | | | |
|---|---|---|---|---|
| | 4 | 5 | 6 | 7 |
| Percent Conversion: | | | | |
| $CH_4$ | 97.8 | 100 | 100 | 100 |
| HF | 97.7 | 98.3 | 98.3 | 98.3 |
| Cl | 93.4 | 94.1 | 95.3 | 95.2 |
| Percent Yield: | | | | |
| $CFCl_3$ | 98.6 | 98 | 96.4 | 95.8 |
| $CF_2Cl_2$ | 1.4 | 2 | 3.6 | 4.2 |

EXAMPLES 8–10

Propylene was reacted with hydrogen fluoride and chlorine in an 85 cc. reactor made from a section of ½ in. stainless steel tubing in the form of a U-tube. Thermocouples were inserted into each leg of the U-tube for temperature measurements. The reaction temperature was maintained by a stirred, molten salt bath. Reactants were metered by standard flow metering devices and mixed before entering the heated portion of the reactor. Reactions were carried out as follows:

| Reaction Conditions | Example | | |
|---|---|---|---|
| | 8 | 9 | 10 |
| Temperature, °C | 350 | 450 | 450 |
| Pressure, atm. abs | 1 | 1 | 1 |
| Residence time, sec | 2.4 | 2.1 | 2.9 |
| Feed rates, cc./min.: | | | |
| $C_3H_6$ | 40 | 40 | 40 |
| HF | 237 | 237 | 237 |
| $Cl_2$ | 356 | 356 | 356 |
| $N_2$ | 400 | 400 | 400 |
| Relative moles: | | | |
| $C_3H_6$ | 1 | 1 | 1 |
| HF | 5.7 | 5.7 | 5.7 |
| $Cl_2$ | 8.8 | 8.8 | 8.8 |
| $N_2$ | 10 | 10 | 2.7 |

Exit gases from the reactor were scrubbed with water and 10% KOH and dried by passing them through a bed of NaF pellets and Drierite. Analysis and identification of components in the dried exit gas stream by time-of-flight mass spectrometry indicated the following results:

| Result | Example | | |
|---|---|---|---|
| | 8 | 9 | 10 |
| Percent Conversion: $C_3H_6$ | 100 | 100 | 100 |
| Percent Yield: | | | |
| $CF_3CH=CH_2$ | 40 | | |
| $CF_3CH=CHCl$ | 10 | | 8 |
| $CHFCH=CHCl$ | 10 | | |
| $CF_3CH=CCl_2$ | 20 | | 4 |
| $CHF_2CH=CCl_2$ | 20 | | |
| $CF_3CH=CHCl+CCl_3F$ | | 18 | 4 |
| $CF_3CCl=CClF$ | | 3 | |
| $CF_3CCl=CHCl$ | | 52 | 61 |
| $CF_3CCl=CCl_2$ | | 24 | 15 |
| $CF_2ClCH=CCl_2$ | | 3 | 1 |
| $CCl_2F_2$ | | | 2 |
| $CF_3CF=CHCl$ | | | 1 |
| $CF_3CH=CFCl$ | | | 4 |

EXAMPLE 11

Propylene was reacted with chlorine and hydrogen fluoride using the apparatus described in Examples 8–10 except that chlorination alone was effected in the first half of the reactor. At the midpoint of the reactor, preheated HF and additional $N_2$ was introduced to effect fluorination. The reaction was carried out under the following conditions:

Temperature _____ °C__ 450
Pressure _____ Atmospheric
Total residence time _____ sec__ 3.3
Feed rates, chlorination:
  $C_3H_6$ _____ cc./min__ 40
  $Cl_2$ _____ cc./min__ 356
  $N_2$ _____ cc./min__ 190
Fluorination:
  HF _____ cc./min__ 237
  $N_2$ _____ cc./min__ 50
Relative moles, $C_3H_6/HF/Cl_2/N_2$ _____ 1/5.7/8.8/6

Analysis of an exit gas sample indicated the following results:

Percent conversion, $C_3H_6$ _____ 100
Percent yield:
  $CF_2Cl_2$ _____ 10
  $CFCl_3$ _____ 82
  $CF_3CCl=CHCl$ _____ 0.6
  $CF_3CCl=CCl_2$ _____ 2.5
  $CF_2ClCH=CCl_2$ _____ 1.3
  $CHCl=CCl_2$ _____ 1.3
  $CCl_2=CCl_2$ _____ 2.5

EXAMPLES 12–13

Using the apparatus of Examples 8–10, isobutylene was reacted with hydrogen fluoride and chlorine as follows:

| Reaction Conditions | Example | |
|---|---|---|
| | 12 | 13 |
| Temperature, °C | 400–410 | 450 |
| Pressure, atm. abs | 1 | 1 |
| Residence time, sec | 2.2 | 2.7 |
| Feed rates, cc./min.: | | |
| $C_4H_8$ | 33 | 33 |
| HF | 266 | 266 |
| $Cl_2$ | 399 | 399 |
| $N_2$ | 330 | 130 |
| Relative moles: | | |
| $C_4H_8$ | 1 | 1 |
| HF | 8.1 | 8.1 |
| $Cl_2$ | 12.1 | 12.1 |
| $N_2$ | 10 | 4 |

Analysis of a sample of the effluent gas indicated the following results:

| Results | Example | |
|---|---|---|
| | 12 | 13 |
| Percent Conversion: | | |
| $C_4H_8$ | 100 | 100 |
| $CF_3Cl$ | | 3 |
| Percent Yield: | | |
| $CF_2Cl_2$ | 13 | 12 |
| $CFCl_3$ | 27 | 24 |
| $(CF_3)_2C=CHCl$ | 7 | 12 |
| $\begin{array}{c}CF_2Cl\\ \diagdown\\ \phantom{xx}C=CFCl\\ \diagup\\ CF_3\end{array}$ | 3 | 6 |
| $(CF_3)_2C=CCl_2$ | 3 | 12 |
| $\begin{array}{c}CF_2Cl\\ \diagdown\\ \phantom{xx}C=CHCl\\ \diagup\\ CF_3\end{array}$ | 13 | 6 |
| $CCl_4+CF_3CCl=CCl_2$ | 13 | 24 |
| $(CF_2Cl)_2C=CFCl$ | 7 | |
| $CCl_3=CCl_2$ | 13 | |

EXAMPLES 14–15

Using the apparatus of Examples 8–10, butadiene-1,3 was reacted with hydrogen fluoride and chlorine as follows:

| Reaction Conditions | Example | |
|---|---|---|
| | 14 | 15 |
| Temperature, °C | 400 | 450 |
| Pressure, atm. abs | 1 | 1 |
| Residence time, sec | 2.2 | 2.7 |
| Feed rates, cc./min.: | | |
| $C_4H_6$ | 35 | 35 |
| HF | 276 | 276 |
| $Cl_2$ | 380 | 380 |
| $N_2$ | 345 | 125 |
| Relative moles: | | |
| $C_4H_6$ | 1 | 1 |
| HF | 7.9 | 7.9 |
| $Cl_2$ | 10.8 | 10.8 |
| $N_2$ | 9.9 | 3.6 |

Analysis of gaseous effluent product indicated the following results:

| Results | Example | |
|---|---|---|
| | 14 | 15 |
| Percent Conversion: $C_4H_6$ | 100 | 100 |
| Percent Yield: | | |
| $CF_3Cl$ | 5.5 | 4 |
| $CF_2Cl_2$ | | 8 |
| $CCl_3F$ | 5.5 | 32 |
| $CF_3CCl_3$ | | 16 |
| $CF_3CH=CHCF_2Cl$ | 5.5 | 4 |
| $CClF_2CH=CHCF_2Cl$ | 22 | |
| trans-$CClF_2CH=CHCF_2Cl+CHCl_3$ | 11 | |
| $CF_2ClCH=CClCF_2Cl$ | 44 | |
| $CF_3CH=CClCF_3$ | | 4 |
| $CF_3CH=CClCF_2Cl$ or $CF_3CCl=CHCF_2Cl$ | | 32 |
| $CCl_2=CCl_2$ | 5.5 | |

Although the invention has been described and exemplified by way of specific embodiments, it is intended that it not be limited thereto. As will be apparent to those skilled in the art, numerous modifications and variations of the embodiments illustrated above may be made without departing from the spirit of the invention or the scope of the following claims:

The embodiments of the invention in which an exclusive property or privilege is claimed are defined as follows:

1. A noncatalytic process for the manufacture of chlorofluoroaliphatic hydrocarbons which comprises reacting an aliphatic starting material selected from the group consisting of aliphatic hydrocarbons of 1–4 carbon atoms and partially chlorinated aliphatic hydrocarbons of 1–4 carbon atoms with at least one mole of hydrogen fluoride and at least one mole of chlorine per mole of aliphatic starting material in the absence of fluorination catalyst in the vapor phase at a temperature of 300–500° C., a pressure of 1–10 atmospheres and a reaction time of 1–60 seconds.

2. The process of claim 1 in which the pressure is not in excess of 5 atmospheres and the reaction time is not in excess of 30 seconds.

3. The process of claim 2 in which at least one mole of chlorine is charged per equivalent of hydrogen and unsaturation in the aliphatic starting material and at least one mole of inert diluent is charged per mole of aliphatic starting material.

4. The process of claim 3 in which the aliphatic starting material is selected from the group consisting of aliphatic hydrocarbons of 1–2 carbon atoms and alkyl monochlorides of 1–2 carbon atoms.

5. The process of claim 4 in which at least four moles of hydrogen chloride are charged per mole of aliphatic starting material.

6. The process of claim 5 in which the aliphatic starting material is methane.

7. The process of claim 4 in which at least four moles of a perchlorinated aliphatic hydrocarbon of 1–2 carbon atoms are charged per mole of aliphatic starting material.

8. The process of claim 7 in which the aliphatic starting material is methane and 4–25 moles of carbon tetrachloride are charged per mole of methane.

9. The process of claim 4 in which the aliphatic starting material is methyl chloride.

10. The process of claim 4 in which the aliphatic starting material is ethylene.

References Cited

UNITED STATES PATENTS 2,443,630   6/1948   McBee et al.

FOREIGN PATENTS 715,613   8/1965   Canada.

DANIEL D. HORWITY, *Primary Examiner.*

U.S. Cl. X.R.

260—652, 653.6, 653.7, 654, 659, 664